Dec. 28, 1937. H. F. HANSON 2,103,781
YIELDABLE GEAR
Filed April 16, 1936
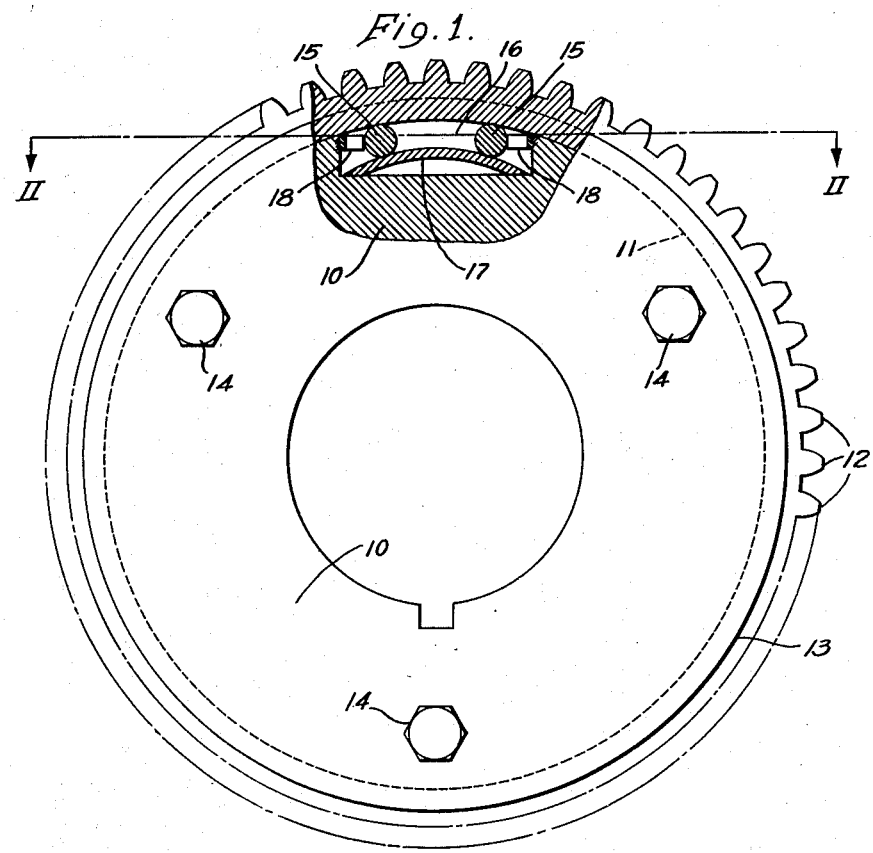
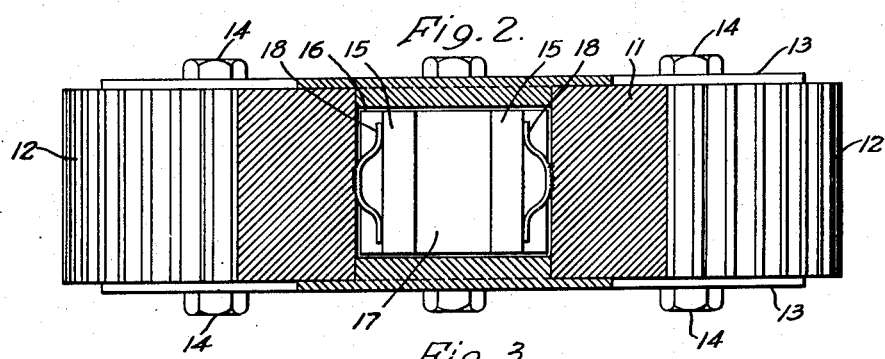
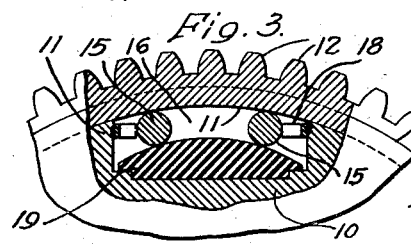
WITNESSES:
Michael Stark
INVENTOR
Harold F. Hanson.
BY
ATTORNEY Patented Dec. 28, 1937

2,103,781

UNITED STATES PATENT OFFICE 2,103,781

YIELDABLE GEAR

Harold F. Hanson, Forest Hills, Pa., assignor to Westinghouse Electric & Manufacturing Company, East Pittsburgh, Pa., a corporation of Pennsylvania Application April 16, 1936, Serial No. 74,676

5 Claims. (Cl. 192—44)

My invention relates, generally, to power transmitting apparatus and more particularly to slip gears for use in gear driving mechanisms.

An object of my invention, generally stated, is to provide a gear driving mechanism which shall be simple and reliable in operation and which may be economically manufactured and installed.

A more specific object of my invention is to provide an overload release device for protecting a gear driving mechanism against injury from abnormal conditions.

Another object of my invention is to provide an overload release device for a gearing mechanism which can readily be reset to its normal operating position.

Other objects of my invention will be explained fully hereinafter or will be apparent to those skilled in the art.

According to one embodiment of my invention, the gear rim of a gear is constructed separately from the gear center. The gear rim is driven by means of a pair of rollers disposed between the inside of the rim and a curved resilient seat in the gear center. When a predetermined load is reached, or in the event of a locked condition of one of the gear elements, the roller seat deflects sufficiently to permit one of the rollers to pass over the highest part of the seat and release the gear rim. One roller is required for each direction of rotation and they are held in contact with the gear rim by means of light springs.

For a fuller understanding of the nature and objects of my invention, reference may be had to the following detailed description, taken in conjunction with the accompanying drawing, in which:

Figure 1 is a view, in side elevation, of a gear embodying my invention, a portion of the gear elements being cut away for clearness;

Fig. 2 is a view, in section, taken along the line II—II of Fig. 1; and

Fig. 3 is a fragmentary view of a portion of a gear showing a modified form of the invention illustrated in Figs. 1 and 2.

Referring now to Figs. 1 and 2 of the drawing, the gear shown comprises a gear center 10 which may be keyed onto a shaft (not shown) to drive, or be driven by, the shaft in either direction of rotation. A gear rim 11, having a plurality of teeth 12, is rotatably mounted on the gear center 10. The gear rim may be held in working relation on the gear center in any suitable manner, such for example, as by means of a pair of plates 13, one of which is bolted onto each side of the gear center by stud bolts 14. The diameter of the plates 13 is greater than the diameter of the gear center; therefore, they overlap the gear rim and prevent it from coming off the gear center.

In order to prevent injury to the gear, or connected apparatus, in the event of an abnormal load on the gear teeth, the gear rim is constructed entirely separate from the gear center and torque is transmitted between the rim and the center by means of a pair of cylindrical rollers 15. The rollers 15 are disposed in a rectangular slot 16, provided in the gear center, between the inner side of the gear rim and a curved spring 17 seated on the bottom of the slot 16.

As shown, one of the rollers 15 is normally disposed on each side of the uppermost part of the curved spring 17, the distance between the gear rim and the highest part of the spring being less than the diameter of the rollers 15. Each one of the rollers is held in contact with the gear rim 11 and the heavy spring 17 by a light spring 18 which may be secured to one side wall of the slot 16 by welding, or in any other suitable manner.

Under normal operating conditions, the gear rim is prevented from slipping on the gear center by one of the rollers 15, depending upon the direction of rotation, the roller being wedged between the inner side of the gear rim and the spring 17 to transmit torque from the gear center to the gear rim or vice versa. When the torque exceeds a predetermined amount, the spring 17 is compressed sufficiently to permit the roller to pass over the highest part of the spring and release the gear rim, thereby preventing injury to the mechanism. After the roller has once passed over the hump, the gear center is permitted to run freely within the gear rim until the device is reset by replacing the roller in its original position. The device may be reset by removing one of the plates 13 and placing the rollers in their proper position, after which the plate may be replaced to retain the rollers in the slot 16.

As illustrated, the gear is reversible and will operate in either direction of rotation. If desired to operate in only one direction, it is necessary to provide only one of the rollers 15, depending upon the desired direction of rotation.

In the modification of the invention shown in Fig. 3, the spring 17 is replaced by a resilient block 19 having a curved surface for engaging the rollers 15. The block 19 may be composed of rubber or other suitable resilient material, and it functions to release the gear rim under overload conditions in the same manner as the spring 17, the block being compressed by the rollers when the torque exceeds a predetermined amount. If desired, the block 19 may be made of a solid material, in which case it is necessary for the gear rim to function as a spring and distort sufficiently to permit one of the rollers to pass over the highest part of the block, thereby releasing the rim from the gear center. The device illustrated in Fig. 3 may be reset in the manner hereinbefore described.

From the foregoing description, it is evident that I have provided an overload release device for a gear which will protect the mechanism against injury from abnormal conditions and which may readily be reset to its normal operating position. The device herein-described may be utilized in gearing mechanisms for driving numerous kinds of apparatus when it is necessary to protect the apparatus and the driving mechanism against injury by overloads or a locked condition in the driven apparatus.

Since numerous changes may be made in the above-described construction and different embodiments of the invention may be made without departing from the spirit and scope thereof, it is intended that all matter contained in the foregoing description or shown in the accompanying drawing shall be interpreted as illustrative and not in a limiting sense.

I claim as my invention:

1. A reversible gear comprising a gear center, a gear rim rotatably mounted on the gear center, a pair of rollers disposed between the gear rim and the gear center, and resilient means disposed between the rollers and having a convex surface engaging both of said rollers to yieldingly hold them in contact with the gear rim, thereby wedging the rollers between the gear rim and the resilient means to transmit torque between the gear rim and the gear center.

2. A reversible gear comprising a gear center, a gear rim rotatably mounted on the gear center, a pair of rollers disposed between the gear rim and the gear center, resilient means disposed between the rollers and having a convex surface engaging both of said rollers to yieldingly hold them in contact with the gear rim to transmit torque between the gear rim and the gear center, and means disposed between the gear center and the rollers for retaining the rollers in contact with the gear rim and the said resilient means.

3. A reversible gear comprising a gear center having a slot therein, a gear rim rotatably mounted on the gear center, a pair of rollers disposed in the slot, and resilient means disposed in said slot and having an arcuate surface engaging said rollers to yieldingly hold the rollers in contact with the gear rim, the highest part of said arcuate surface being normally between said rollers, thereby wedging the rollers between the gear rim and said resilient means to transmit torque between the gear rim and the gear center.

4. A reversible gear comprising a gear center having a slot therein, a gear rim rotatably mounted on the gear center, a pair of rollers disposed in the slot, resilient means disposed in said slot between the rollers and the gear center and having an arcuate surface engaging said rollers to yieldingly hold the rollers in contact with the gear rim to transmit torque between the gear rim and the gear center, said rollers being normally disposed at each side of the highest part of said arcuate surface, and means removably secured to the gear center for retaining the rollers in the slot.

5. A reversible gear comprising a gear center having an opening therein, a gear rim rotatably mounted on the gear center, a pair of rollers disposed in the opening, resilient means having a curved surface disposed in the bottom of said opening, the highest part of said curved surface being normally between said rollers, and additional resilient means disposed in said slot for engaging said rollers.

HAROLD F. HANSON.